(12) United States Patent
Marin et al.

(10) Patent No.: US 7,832,287 B2
(45) Date of Patent: Nov. 16, 2010

(54) SENSOR GAP BALANCER (75) Inventors: Carlos E Marin, Milan, MI (US); Micheal P Portell, Ann Arbor, MI (US); Paul D. Stevenson, Ann Arbor, MI (US); John R. Maten, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 509 days.

(21) Appl. No.: 11/744,358

(22) Filed: May 4, 2007

(65) Prior Publication Data
US 2008/0271534 A1 Nov. 6, 2008

(51) Int. Cl.
G01L 3/04 (2006.01)
(52) U.S. Cl. .................................. 73/862.321
(58) Field of Classification Search ................ 384/456, 384/484; 73/862.321–862.336
See application file for complete search history.

(56) References Cited

U.S. PATENT DOCUMENTS

| 4,724,710 | A | 2/1988 | Murty |
| 5,907,105 | A | 5/1999 | Pinkerton et al. |
| 7,117,755 | B2 | 10/2006 | Yang |
| 2004/0194558 | A1* | 10/2004 | Nagase ................. 73/862.326 |

* cited by examiner

Primary Examiner—Lisa M Caputo
Assistant Examiner—Punam Roy (57) ABSTRACT

An assembly for positioning a torque sensor having a receiver and a transmitter is provided. The assembly includes a first annular member, wherein the receiver is coupled to the first annular member. A second annular member is disposed proximate the first annular member. A bearing assembly is disposed between the first annular member and the second annular member. The bearing assembly includes a first race formed to the first annular member, a second race formed to the second annular member, and a bearing disposed between the first race and the second race for allowing the first race and the second race to rotate relative to one another. A radially extending member is coupled to the second race. The receiver is radially displaced from the bearing assembly and the transmitter is mounted to a mounting surface of the radially extending member opposite the receiver at a predefined axial distance.

14 Claims, 6 Drawing Sheets

FIG. 1

FIG. 2
(SECTION 2-2)

FIG. 3

FIG. 4
(SECTION 4-4)

FIG. 5

FIG. 6
(SECTION 6-6)

FIG. 7

FIG. 8
(SECTION 8-8)

FIG. 9

FIG. 10
(SECTION 10-10)

FIG. 11

FIG. 12
(SECTION 12-12)

SENSOR GAP BALANCER

FIELD

The present disclosure relates to sensors, and more particularly to a gap balancer for a sensor.

BACKGROUND

The statements in this section merely provide background information related to the present disclosure and may or may not constitute prior art.

It is often desirable to determine the torque on a rotating shaft (rotator) relative to a stationary component (stator). A typical application that includes a rotator and a stator is an automatic transmission.

In order to determine the torque being applied to the rotator, a torque sensor is used to measure the torque. Common torque sensors include strain gages, magnetic or optical sensors, and surface acoustic wave (SAW) sensors. These torque sensors each measure various parameters such as local strain, angular displacement, or strained-induced change on an acoustic wave. Typically these torque sensors have two components including what can generally be referred to as a transmitter and a receiver. The receiver is typically coupled to the rotator and the transmitter is coupled to the stator. In the case of magnetic sensors and SAW sensors, a current is induced through the transmitter and torque applied on the rotator is transmitted back to the transmitter in a form of current, radio signal or magnetic field which is then converted into an estimated torque. One crucial element to determining the amount of torque using these sensors is knowing and controlling the gap distance between the transmitter and receiver.

Accordingly, one limitation of the above described torque sensors is that any discrepancy in the expected gap distance used in calculating the torque from the actual gap distance between the receiver and the transmitter can increase the margin of error in the torque calculation. Because the system tolerances between the rotator and the stator are often not precisely known, at best the expected gap distance will be an estimate. Therefore, there is room in the art to provide a device that reduces the error between the expected gap distance and the actual gap distance.

SUMMARY

The present invention provides an assembly for positioning a torque sensor having a receiver and a transmitter.

In a first aspect of the present invention, the assembly includes a first annular member, wherein the receiver is coupled to the first annular member. A second annular member is disposed proximate the first annular member. A bearing assembly is disposed between the first annular member and the second annular member, the bearing assembly includes a first race formed to the first annular member, a second race formed to the second annular member, and a bearing disposed between the first race and the second race for allowing the first race and the second race to rotate relative to one another. A radially extending member is coupled to the second race. The receiver is radially displaced from the bearing assembly and the transmitter is mounted to a mounting surface of the radially extending member opposite the receiver at a predefined axial distance.

In another aspect of the present invention, the second race includes an axially extending portion.

In still another aspect of the present invention, the radially extending member includes a radially extending segment coupled to the axially extending portion of the second race, and the radially extending member further includes an axially extending segment coupled to the radially extending segment at one end and coupled to the mounting surface at an opposite end thereof.

In still another aspect of the present invention, the mounting surface extends radially outward from the axially extending segment.

In yet another aspect of the present invention, the second annular member includes a lip proximate to the bearing assembly and the radially extending member includes a groove for receiving the lip therein.

In still another aspect of the present invention, the radially extending member includes a radially extending segment and the mounting surface includes a curved axial step down coupled to the radially extending segment.

In still another aspect of the present invention, the radially extending member includes a radially extending segment and the mounting surface includes an axial step down coupled to the radially extending segment.

In still another aspect of the present invention, the radially extending member extends radially inward.

In still another aspect of the present invention, the radially extending member extends radially outward.

In a still another aspect of the present invention, the assembly further includes a spring mechanism disposed between the radially extending member and the second annular member.

In a second aspect of the present invention, an assembly includes a receiver for sending a signal, a transmitter for receiving the signal from the receiver, a first annular member, wherein the receiver is coupled to the first annular member, a second annular member disposed proximate the first annular member, a bearing element disposed between the first annular member and the second annular member, the bearing element for allowing the first annular member and the second annular member to rotate relative to one another, and a radially extending member coupled to the bearing element. The receiver is radially displaced from the bearing element and the transmitter is mounted to a mounting surface of the radially extending member opposite the receiver at a predefined axial distance.

In another aspect of the present invention, the bearing element is an annular washer.

In a still another aspect of the present invention, the bearing element includes a plurality of rollers.

In a still another aspect of the present invention, the radially extending member extends radially inward.

In a still another aspect of the present invention, the radially extending member includes a backing member that engages the bearing element.

In a still another aspect of the present invention, the assembly further includes a spring mechanism disposed between the radially extending member and the second annular member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
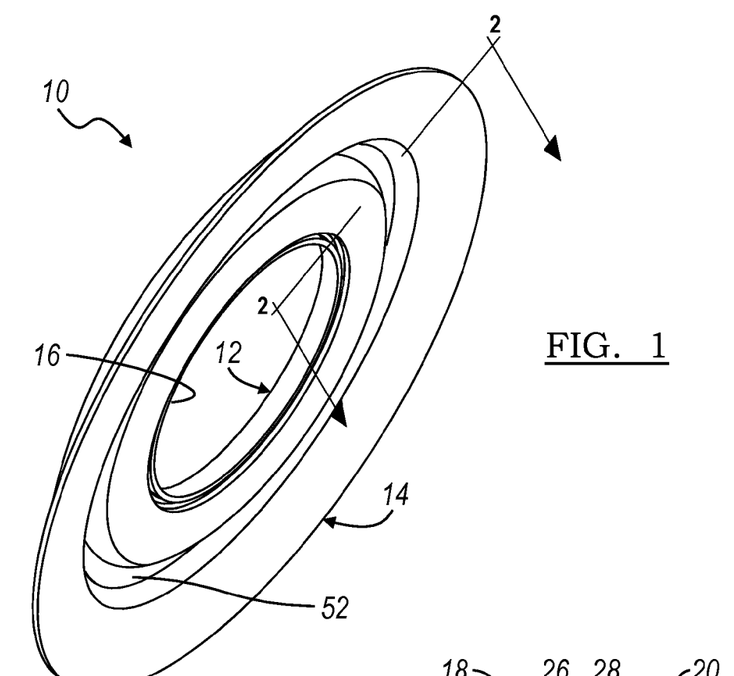
FIG. 1 is an isometric view of a gap balancer according to the principles of the present invention.

FIG. 1 illustrates a gap balancer 10 designed according to the principles of the present invention. The gap balancer 10 includes a bearing assembly 12 coupled with an extending member 14. The extending member 14 extends radially outward from the bearing assembly 12. The gap balancer 10 is annularly shaped and defines a bore 16.

Figure 2:
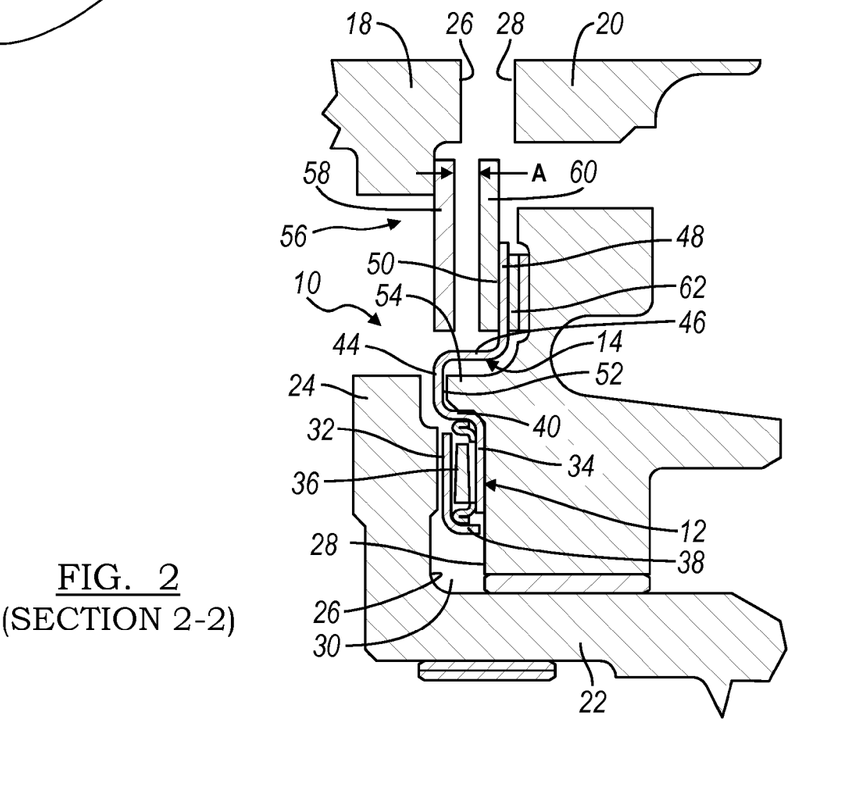
FIG. 2 is a side cross-sectional view of the gap balancer taken in the direction of arrows 2-2 shown in FIG. 1 and illustrated in use with an exemplary transmission.

Turning to FIG. 2, the gap balancer 10 is illustrated in use with an exemplary first annular component 18 and an exemplary second annular component 20. The first annular component 18 includes an axial portion 22 with a radially extending portion 24 extending therefrom. The radially extending portion 24 includes a first surface 26. The second annular component 20 includes a second surface 28. The first annular component 18 is disposed proximate to the second annular component 20 such that the first surface 26 is opposite the second surface 28. The radially extending portion 24 of the first component 18 and the second component 20 define a gap 30. The gap balancer 10 is disposed between the first annular component 18 and the second annular component 20 within the gap 30. The axially extending portion 22 of the first annular component 18 extends through the bore 16 of the gap balancer 10. In the preferred embodiment, the first annular component 18 is a rotatable shaft and the second annular component 20 is a fixed housing. However, it should be appreciated that either the first annular component 18 or second annular component 20 may be fixed or rotatable with respect to one another.

The bearing assembly 12 of the gap balancer 10 includes a first race 32 disposed opposite a second race 34 and at least one bearing element 36 disposed between the first race 32 and the second race 34. The first race 32 is formed to the first surface 26 of the first annular component 18. The second race 34 is formed to the second surface 28 of the second annular component 20. The first race 32 includes a first arm 38 that extends in an axial direction towards the second race 34. In turn, the second race 34 includes a second arm 40 that extends in an axial direction towards the first race 32. The first arm 38 is positioned radially inward relative to the second arm 40. The first race 32, the first arm 38, the second race 34, and the second arm 40 all cooperate to form a bearing cage for the bearing element 36.

As noted above, the bearing element 36 is disposed between the first race 32 and the second race 34. In the preferred embodiment of the present invention, the bearing element 36 is a roller, however it should be appreciated that various other bearings may be employed, such as, for example, a ball. A plurality of bearing elements 36 may be disposed within the bearing assembly 12. The bearing element 36 allows the first race 32 and the second race 34 to move relative to one another, which in turn allows the first annular component 18 and the second annular component 20 to move relative to one another.

The extending member 14 of the gap balancer 10 includes a radial segment 44, an axial segment 46, and a mounting flange 48. The radial segment 44 is coupled to an end of the second arm 40 of the second race 34 of the bearing assembly 12. The radial segment 44 extends radially outward from the bearing assembly 12 and is annular in shape. The axial segment 46 is coupled to the radial segment 44. The mounting flange 48 is coupled to the axial segment 46 and extends radially outward. The mounting flange 48 includes a mounting surface 50. The second arm 40 of the second race 34, the radial segment 44, and the axial segment 46 all cooperate to define an annular groove 52 formed in the gap balancer 10 (see also FIG. 1). The annular groove 52 is sized to fit overtop a lip 54 formed in the second surface 28 of the second component 20.

In order to determine the torque of the first annular component 18 in the example provided, a torque sensor 56 is disposed within the gap 30 between the first annular component 18 and the second annular component 20. The torque sensor 56 is preferably a SAW sensor, though it should be appreciated that the torque sensor 56 may take various forms without departing from the scope of the present invention. The torque sensor 56 includes a rotating component or receiver 58 and a stationary component or transmitter 60. The receiver 58 is coupled to the first surface 26 of the first annular component 18 and is radially displaced with respect to the bearing assembly 12 of the gap balancer 10. The transmitter 60 is mounted to the mounting surface 50 of the extending member 14. The mounting surface 50 of the extending member 14 extends radially outward from the bearing assembly 12 to position the transmitter 60 opposite the receiver 58 at a pre-defined axial distance apart from one another. This axial distance defines a gap distance "A" as indicated throughout the figures. The gap distance "A" may be maintained by adjusting the length of the axial segment 46 of the extending member 14. Torque that is applied to the first annular component 18 strains the receiver 58. This strain alters the output (i.e., a magnetic field, an angular displacement, or an acoustic wave, depending on the type of torque sensor 56 employed) emanating from the receiver 58 such that the output is indicative of the torque being applied to the first annular component 18. The transmitter 60 detects this output and using the predefined axial distance between the receiver 58 and the transmitter 60, a controller (not shown) is able to determine the torque being applied to the first annular component 18.

The gap balancer 10 further includes a spring mechanism 62 coupled to the mounting flange 48 on a side opposite the mounting surface 50. The spring mechanism 62 engages the second surface 28 of the second annular component 20. The spring mechanism 62 may be a coil spring, spring washer, thrust washer, or any other spring element known in the art. The spring mechanism 62 is operable to dampen movement and maintain the gap between the extending member 14 and the second annular component 20 in order to assist in stabilizing the transmitter 60.

By mounting the transmitter 60 to the gap balancer 10, the gap distance "A" may be maintained since any axial movement or float of the first annular component 18 relative to the second annular component 20 will not affect the gap distance "A" as the gap balancer 10 is axially stationary with respect to the first annular component 18. A maintained and known gap distance "A" in turn makes the torque sensor 56 more accurate in the calculation of the torque applied to the first annular component 18.

Figures 3, 4:
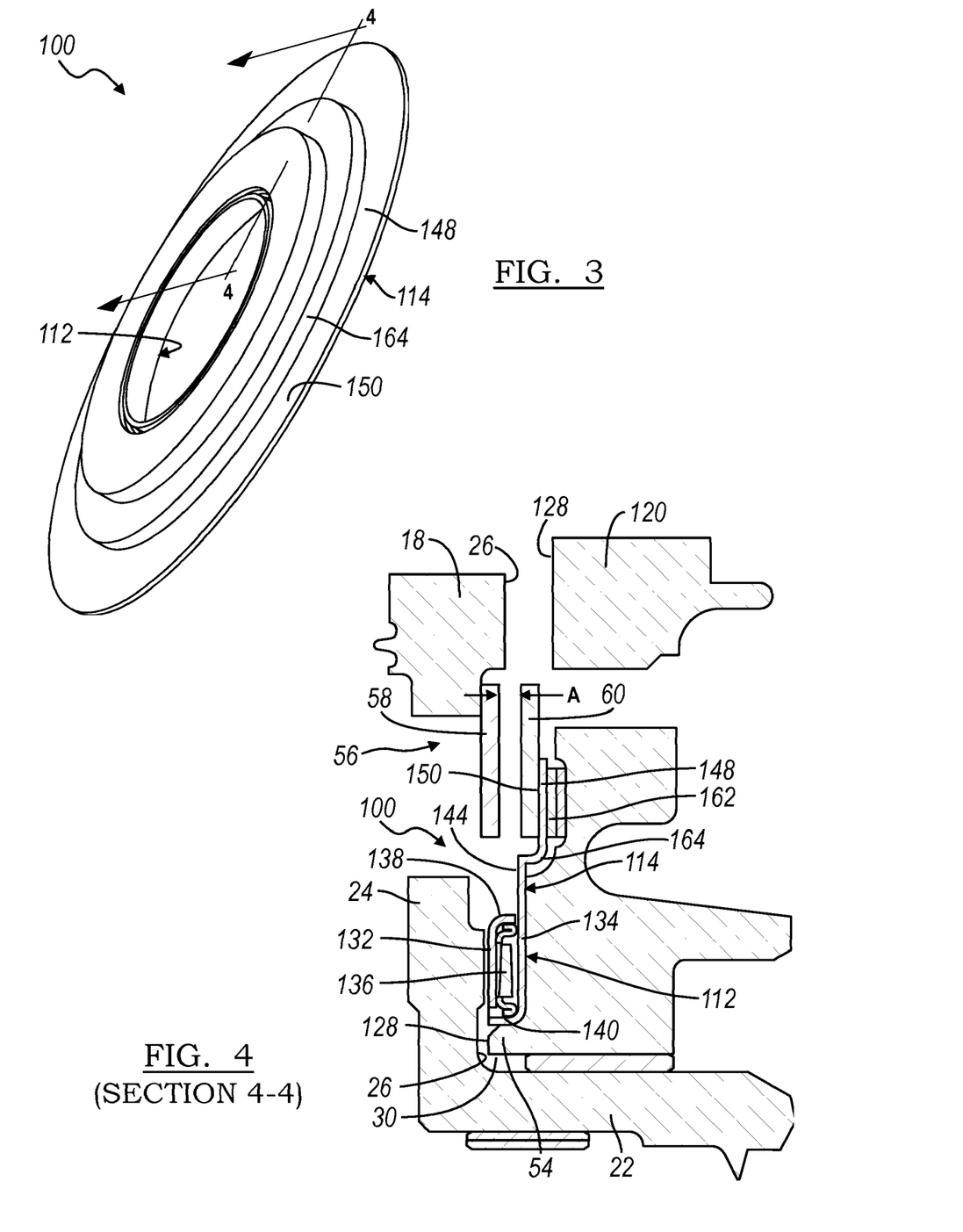
FIG. 3 is an isometric view of a second embodiment of the gap balancer according to the principles of the present invention.
FIG. 4 is a side cross-sectional view of the second gap balancer taken in the direction of arrows 4-4 shown in FIG. 3 and illustrated in use with an exemplary transmission.

Turning now to FIGS. 3 and 4, a second gap balancer 100 is illustrated together with the first annular component 18, a second annular component 120, and the torque sensor 56. The second annular component 120 is substantially identical to the annular component 20 illustrated in FIG. 2, however, the lip 54 is positioned on an opposite side of the gap sensor 100 than the lip 54 illustrated in FIG. 3.

The second gap balancer 100 includes a bearing assembly 112 and an extending member 114. The bearing assembly 112 includes a first race 132 disposed opposite a second race 134 and at least one bearing element 136 disposed between the first race 132 and the second race 134. The first race 132 is formed to the first surface 26 of the first annular component 18. The second race 134 is formed to the second surface 128 of the second annular component 120. The first race 132 includes a first arm 138 that extends in an axial direction towards the second race 134. In turn, the second race 134 includes a second arm 140 that extends in an axial direction towards the first race 132. The first arm 138 is positioned radially outward relative to the second arm 140 (opposite to that shown in FIG. 2). The first race 132, the first arm 138, the second race 134, and the second arm 140 all cooperate to form a bearing cage for the bearing element 136. The bearing element 136 functions in a manner substantially similar to the bearing element 36 shown in FIG. 2.

The extending member 114 of the second gap balancer 100 includes a radial segment 144 and a mounting flange 148. The radial segment 144 is coupled to the second race 134. The radial segment 144 extends outward from the bearing assembly 112 and is annular in shape. The mounting flange 148 is coupled to the radial segment 144 at a curved step down portion 164. The mounting flange 148 in turn extends radially outward from the radial segment 144 and the curved step down portion 164. The curved step down portion 164 is preferably formed unitarily with the radial segment 144 and the mounting flange 148.

The mounting flange 148 includes a curved step down portion 164 at an end thereof. The curved step down portion 164 is coupled to the radial segment 144 such that the mounting flange 148 extends radially outward. The mounting flange 148 further includes a mounting surface 150 for receiving the transmitter 60 thereon.

The mounting surface 150 of the extending member 114 extends radially outward from the bearing assembly 112 to position the transmitter 60 opposite the receiver 58 at the gap distance "A". The gap distance "A" may be modified by adjusting the length of the curved step-down portion 164 of the extending member 114. In this way, the second gap balancer 100 provides the same accurate axial distance between the receiver 58 and the transmitter 60 as the gap balancer 10 provided in FIG. 2.

The second gap balancer 100 further includes a spring mechanism 162 coupled to the mounting flange 148 on a side opposite the mounting surface 150. The spring mechanism 162 engages the second surface 128 of the second annular component 120. The spring mechanism 162 may be a coil spring, spring washer, thrust washer, or any other spring element known in the art. The spring mechanism 162 is operable to dampen movement between the extending member 114 and the second annular component 120 in order to assist in stabilizing the transmitter 60.

Figure 5:
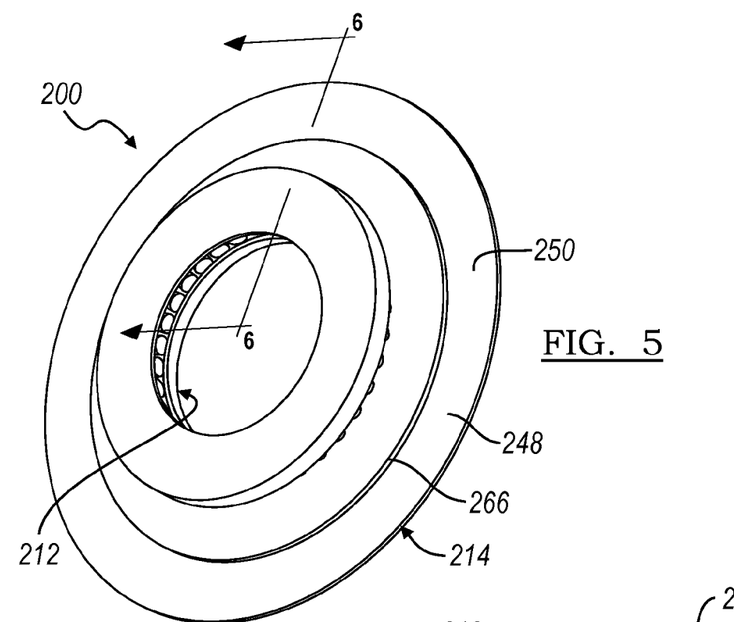
FIG. 5 is an isometric view of a third embodiment of the gap balancer according to the principles of the present invention.
Figure 6:
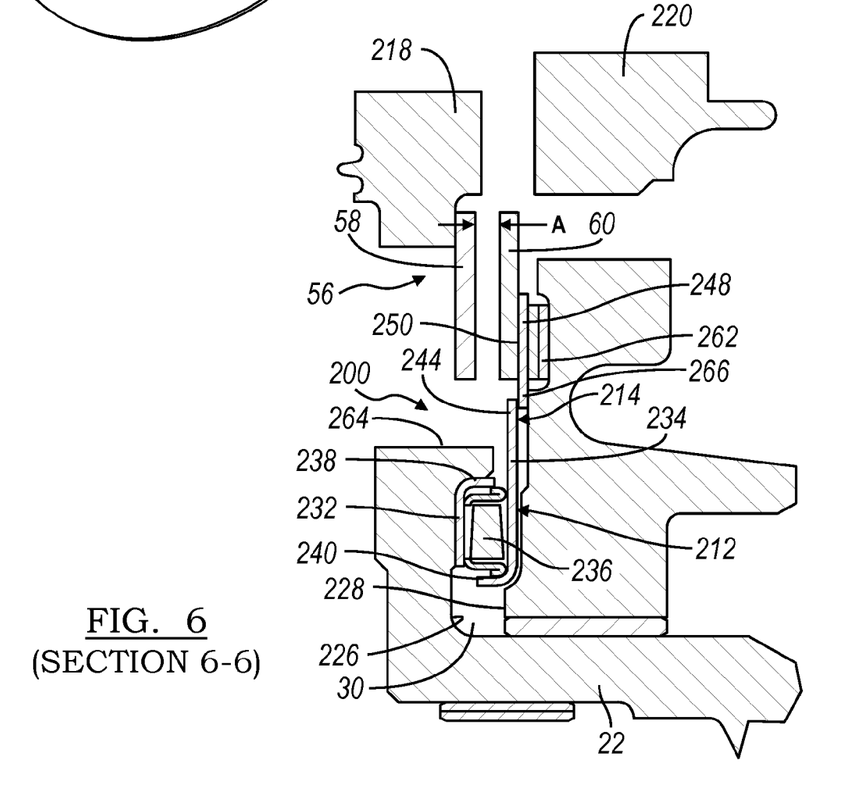
FIG. 6 is a side cross-sectional view of the third gap balancer taken in the direction of arrows 6-6 shown in FIG. 5 and illustrated in use with an exemplary transmission.

With reference to FIGS. 5 and 6, a third gap balancer 200 is illustrated together with a first annular component 218, a second annular component 220, and the torque sensor 56. The first annular component 218 is substantially identical to the first annular component 18 shown in FIG. 2, however, the first annular component 218 includes a lip 264 formed thereon proximate to the third gap balancer 200. The second annular component 220 is substantially identical to the annular component 20 illustrated in FIG. 2, however, the lip 54 has been removed from the second annular component 220.

The third gap balancer 200 includes a bearing assembly 212 and an extending member 214. The bearing assembly 212 is substantially similar to the bearing assembly 112 described in FIG. 3. The bearing assembly 212 includes a first race 232 disposed opposite a second race 234 and at least one bearing element 236 disposed between the first race 232 and the second race 234. The first race 232 is formed to the first surface 226 of the first annular component 18. The second race 234 is formed to the second surface 28 of the second annular component 220. The first race 232 includes a first arm 238 that extends in an axial direction towards the second race 234. In turn, the second race 234 includes a second arm 240 that extends in an axial direction towards the first race 232. The first arm 238 is positioned radially outward relative to the second arm 240 (opposite to that shown in FIG. 2). The first race 232, the first arm 238, the second race 234, and the second arm 240 all cooperate to form a bearing cage for the bearing element 236. The bearing element 236 functions in a manner substantially similar to the bearing element 36 shown in FIG. 2.

The extending member 214 of the third gap sensor 200 includes a radial segment 244 and a mounting flange 248. The radial segment 244 is coupled to the second race 234. The radial segment 244 extends outward from the bearing assembly 212 and is annular in shape. The mounting flange 248 is coupled to the radial segment 244 at a step down portion 266. The mounting flange 248 in turn extends radially outward from the radial segment 244 and the step down portion 266. The step down portion 266 is angular in shape, and may be the product of welding the radial segment 244 and the mounting flange 248 together or the step down portion 266 may be formed unitarily with the radial segment 244 and the mounting flange 248. The mounting flange 248 further includes a mounting surface 250 for receiving the transmitter 60 thereon.

The mounting surface 250 of the extending member 214 extends radially outward from the bearing assembly 212 to position the transmitter 60 opposite the receiver 58 at the gap distance "A". The gap distance "A" may be modified by adjusting the length of the step-down portion 266 of the extending member 214. In this way, the third gap balancer 200 provides the same accurate axial distance between the receiver 58 and the transmitter 60 as the gap balancer 10 provided in FIG. 2.

The third gap balancer 200 further includes a spring mechanism 262 coupled to the mounting flange 248 on a side opposite the mounting surface 250. The spring mechanism 262 engages the second surface 228 of the second annular component 220. The spring mechanism 262 may be a coil spring, spring washer, thrust washer, or any other spring element known in the art. The spring mechanism 262 is operable to dampen movement between the extending member 214 and the second annular component 220 in order to assist in stabilizing the transmitter 60.

Figures 7, 8:
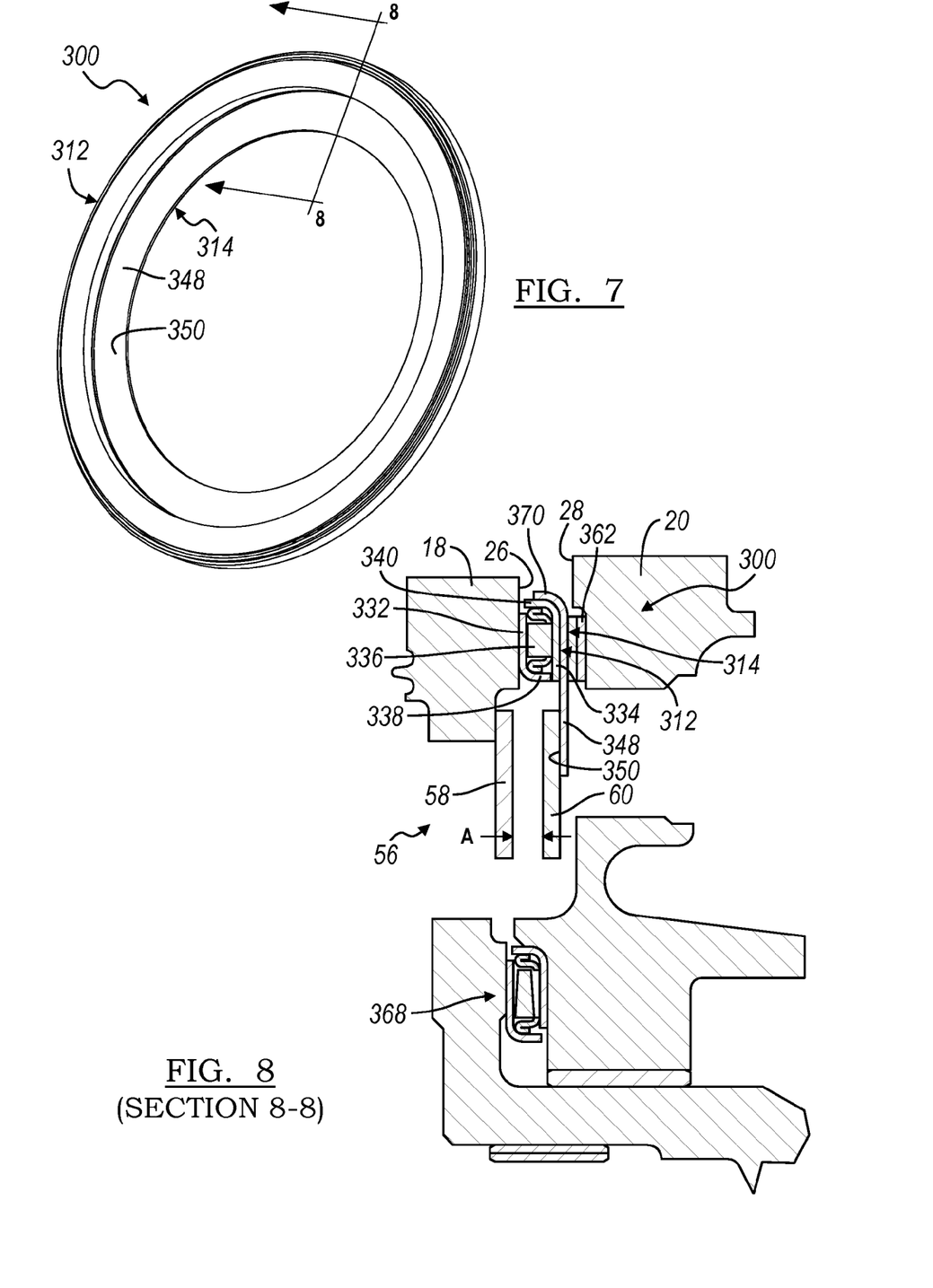
FIG. 7 is an isometric view of a fourth embodiment of the gap balancer according to the principles of the present invention.
FIG. 8 is a side cross-sectional view of the fourth gap balancer taken in the direction of arrows 8-8 shown in FIG. 7 and illustrated in use with an exemplary transmission.

With reference to FIGS. 7 and 8, a fourth gap balancer 300 according to the principles of the present invention is illustrated together with the first annular component 18, the second annular component 20, and the torque sensor 56 as described previously in FIG. 2. A bearing assembly 368 is disposed between the first annular component 18 and the second annular component 20. The fourth gap balancer 300 is disposed between the first annular component 18 and the second annular component 20 radially outward from the bearing assembly 368.

The fourth gap balancer 300 includes a bearing assembly 312 and an extending member 314. The extending member 314 extends radially inward from the bearing assembly 312. The bearing assembly 312 is substantially similar to the bearing assembly 12 described in FIG. 2. The bearing assembly 312 includes a first race 332 disposed opposite a second race 334 and at least one bearing element 336 disposed between the first race 332 and the second race 334. The first race 332 is formed to the first surface 326 of the first annular component 18. The second race 334 is coupled to the extending member 314 as will be described in further detail below. The first race 332 includes a first arm 338 that extends in an axial direction towards the second race 334. In turn, the second race 334 includes a second arm 340 that extends in an axial direction towards the first race 332. The first arm 338 is positioned radially inward relative to the second arm 340. The first race 332, the first arm 338, the second race 334, and the second arm 340 all cooperate to form a bearing cage for the bearing element 336. The bearing element 336 functions in a manner substantially similar to the bearing element 36 shown in FIG. 2.

The extending member 314 of the fourth gap sensor 300 includes a backing member 370 and a mounting flange 348. The mounting flange 348 also includes a mounting surface 350 for receiving the transmitter 60 thereon. The extending member 314 fits around the bearing assembly 312 such that the backing member 370 engages the second arm 340 of the bearing assembly 312 and the mounting flange 348 engages the second race 334 of the bearing assembly 312. The extending member 314 in turn is coupled to a spring mechanism 362. The spring mechanism 362 in turn engages the second surface 28 of the second annular component 20. The spring mechanism 362 may be a coil spring, spring washer, thrust washer, or any other spring element known in the art. The spring mechanism 362 is operable to dampen movement between the extending member 314 and the second annular component 20 in order to assist in stabilizing the transmitter 60.

The mounting surface 350 of the extending member 314 extends radially inward from the bearing assembly 312 to position the transmitter 60 opposite the receiver 58 at the gap distance "A". In this way, the fourth gap balancer 300 provides the same accurate axial distance between the receiver 58 and the transmitter 60 as the gap balancer 10 provided in FIG. 2.

Figures 9, 10:
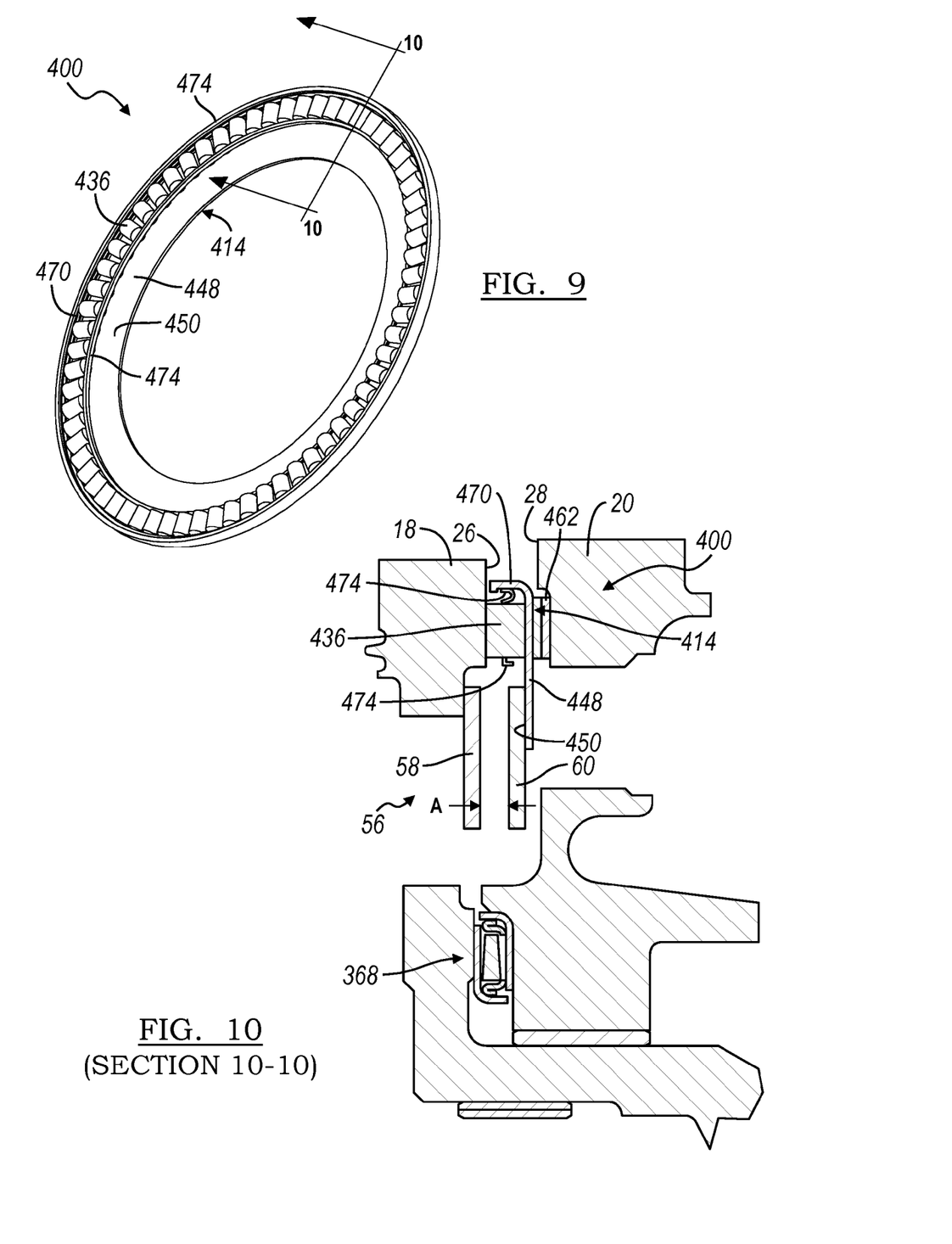
FIG. 9 is an isometric view of a fifth embodiment of the gap balancer according to the principles of the present invention.
FIG. 10 is a side cross-sectional view of the fifth gap balancer taken in the direction of arrows 10-10 shown in FIG. 9 and illustrated in use with an exemplary transmission.

With reference to FIGS. 9 and 10, a fifth gap balancer 400 according to the principles of the present invention is illustrated together with the first annular component 18, the second annular component 20, and the torque sensor 56 as described previously in FIG. 2. The fifth gap balancer 400 is substantially similar to the fourth gap balancer 300 described in FIGS. 7 and 8, however, the first race 332 and the second race 334 have been removed. A pair of retaining rings 472 remain to engage an at least one bearing element 436 disposed between the first annular component 18 and an extending member 414. The bearing element 436 functions in a manner substantially similar to the bearing element 36 shown in FIG. 2.

The extending member 414 of the fifth gap sensor 400 includes a backing member 470 and a mounting flange 448. The mounting flange 448 also includes a mounting surface 450 for receiving the transmitter 60 thereon. The extending member 414 fits around the retaining rings 472 and bearing element 436 such that the backing member 470 engages one of the pair of retaining rings 472. The extending member 414 in turn is coupled to a spring mechanism 462. The spring mechanism 462 in turn engages the second surface 28 of the second annular component 20. The spring mechanism 462 may be a coil spring, spring washer, thrust washer, or any other spring element known in the art. The spring mechanism 462 is operable to dampen movement between the extending member 414 and the second annular component 20 in order to assist in stabilizing the transmitter 60.

The mounting surface 450 of the extending member 414 extends radially inward from the bearing element 436 to position the transmitter 60 opposite the receiver 58 at the gap distance "A". In this way, the fifth gap balancer 400 provides the same accurate axial distance between the receiver 58 and the transmitter 60 as the gap balancer 10 provided in FIG. 2.

Figures 11, 12:
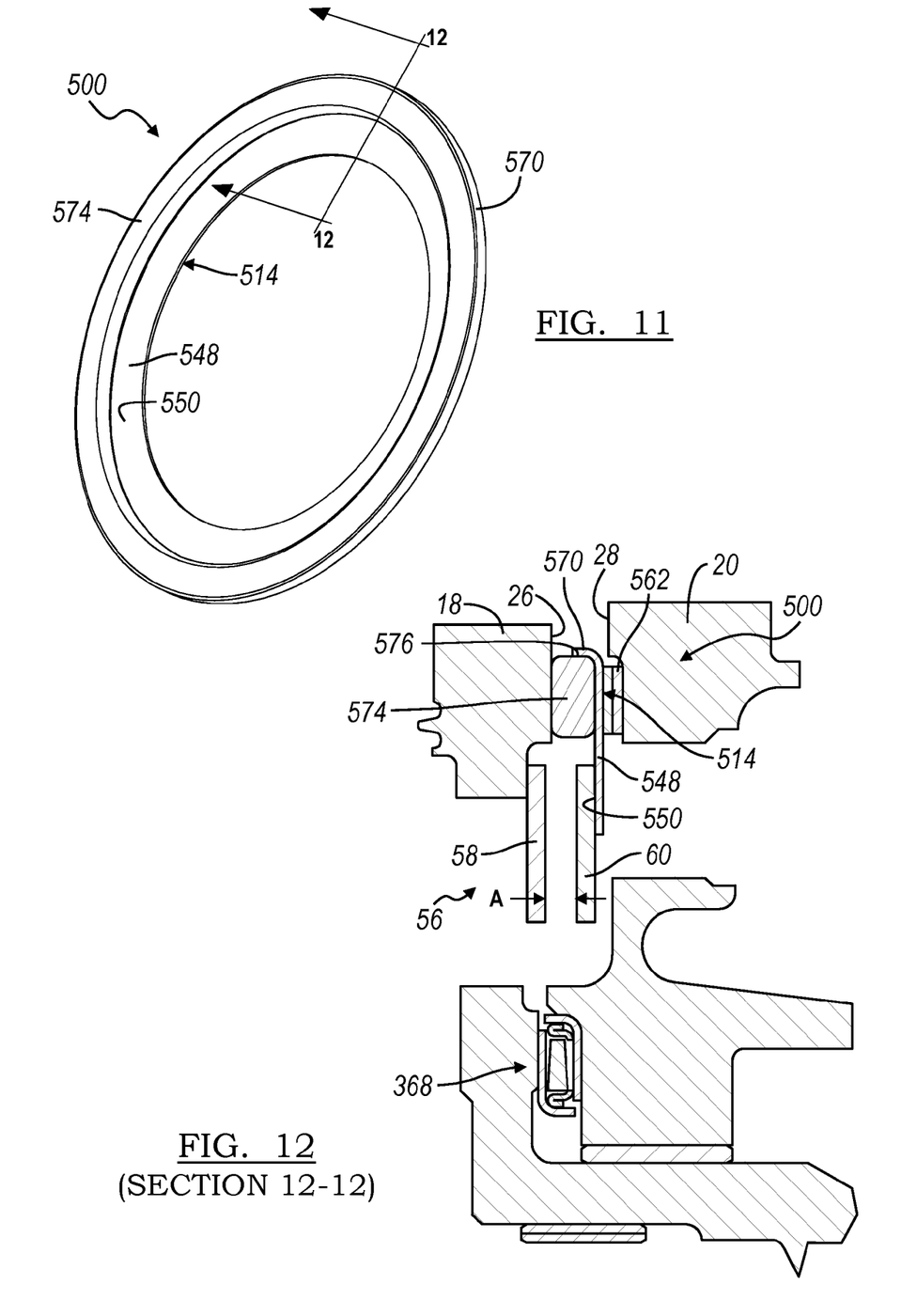
FIG. 11 is an isometric view of a sixth embodiment of the gap balancer according to the principles of the present invention.
FIG. 12 is a side cross-sectional view of the second gap balancer taken in the direction of arrows 12-12 shown in FIG. 11 and illustrated in use with an exemplary transmission.

With reference to FIGS. 11 and 12, a sixth gap balancer 500 according to the principles of the present invention is illustrated together with the first annular component 18, the second annular component 20, and the torque sensor 56 as described previously in FIG. 2. The sixth gap balancer 500 is substantially similar to the fourth gap balancer 300 described in FIGS. 7 and 8, however, the bearing assembly 312 has been replaced with an annular washer 574. The annular washer 574 may be made from Nylon or Polyimide or any other suitable material.

An extending member 514 of the sixth gap sensor 500 is substantially similar to the extending member 314 described in FIGS. 7 and 8 and includes a backing member 570 and a mounting flange 548. The mounting flange 548 also includes a mounting surface 550 for receiving the transmitter 60 thereon. The extending member 514 fits around the annular washer 574 such that the backing member 570 engages a back side 576 of the annular washer 574. The extending member 514 in turn is coupled to a spring mechanism 562. The spring mechanism 562 in turn engages the second surface 28 of the second annular component 20. The spring mechanism 562 may be a coil spring, spring washer, thrust washer, or any other spring element known in the art. The spring mechanism 562 is operable to dampen movement between the extending member 514 and the second annular component 20 in order to assist in stabilizing the transmitter 60.

The mounting surface 550 of the extending member 514 extends radially inward from the annular washer 574 to position the transmitter 60 opposite the receiver 58 at the gap distance "A". In this way, the sixth gap balancer 500 provides the same accurate axial distance between the receiver 58 and the transmitter 60 as the gap balancer 10 provided in FIG. 2.

The description of the invention is merely exemplary in nature and variations that do not depart from the gist of the invention are intended to be within the scope of the invention. Such variations are not to be regarded as a departure from the spirit and scope of the invention.

What is claimed is:

1. An assembly for positioning a torque sensor, the torque sensor having a receiver and a transmitter, the assembly comprising:
    a first annular member, wherein the receiver is coupled to the first annular member;
    a second annular member disposed proximate the first annular member;
    a bearing assembly disposed between the first annular member and the second annular member, the bearing assembly having:
        a first race formed to the first annular member;
        a second race formed to the second annular member;
        a bearing disposed between the first race and the second race for allowing the first race and the second race to rotate relative to one another; and
    a radially extending member coupled to the second race, wherein the receiver is radially displaced from the bearing assembly and the transmitter is mounted to a mounting surface of the radially extending member opposite the receiver at a predefined axial distance; and
    wherein the second annular member includes a lip proximate to the bearing assembly and the radially extending member includes a groove for receiving the lip therein.

2. The assembly of claim 1 wherein the second race includes an axially extending portion.

3. The assembly of claim 2 wherein the radially extending member includes a radially extending segment coupled to the axially extending portion of the second race, and the radially extending member further includes an axially extending segment coupled to the radially extending segment at one end and coupled to the mounting surface at an opposite end thereof.

4. The assembly of claim 3 wherein the mounting surface extends radially outward from the axially extending segment.

5. The assembly of claim 1 wherein the radially extending member includes a radially extending segment and the mounting surface includes a curved axial step down coupled to the radially extending segment.

6. The assembly of claim 1 wherein the radially extending member includes a radially extending segment and the mounting surface includes an axial step down coupled to the radially extending segment.

7. The assembly of claim 1 wherein the radially extending member extends radially inward.

8. The assembly of claim 1 wherein the radially extending member extends radially outward.

9. The assembly of claim 1 further comprising a spring mechanism disposed between the radially extending member and the second annular member.

10. An assembly comprising:
    a torque sensor having a first component and a second component;
    a first annular member, wherein the first component is coupled to the first annular member;
    a second annular member disposed proximate the first annular member;
    a bearing element disposed between the first annular member and the second annular member, the bearing element operable to allow the first annular member and the second annular member to rotate relative to one another; and
    a radially extending member coupled to the bearing element, wherein the first component is radially displaced from the bearing element and the second component is mounted to a mounting surface of the radially extending member opposite the first component at a predefined axial distance; and
    a spring mechanism disposed between the radially extending member and the second annular member.

11. The assembly of claim 10 wherein the bearing element is an annular washer.

12. The assembly of claim 10 wherein the bearing element includes a plurality of rollers.

13. The assembly of claim 10 wherein the radially extending member extends radially inward.

14. The assembly of claim 10 wherein the radially extending member includes a backing member that engages the bearing element.

* * * * *